(12) United States Patent
Kabatek et al.

(10) Patent No.: US 11,865,983 B2
(45) Date of Patent: Jan. 9, 2024

(54) METHOD FOR REDUCING START-UP TIME, VEHICLE, COMPUTER PROGRAM AND DATA CARRIER SIGNAL

(71) Applicant: Continental Automotive GmbH, Hannover (DE)

(72) Inventors: Ulrich Kabatek, Hannover (DE); Martin Stamm, Hannover (DE); Gerhard Müller, Hannover (DE); Axel König, Hannover (DE); Boris Bach, Hannover (DE)

(73) Assignee: Continental Automotive GmbH, Hannover (DE)

( * ) Notice: Subject to any disclaimer, the term of this patent is extended or adjusted under 35 U.S.C. 154(b) by 736 days.

(21) Appl. No.: 16/568,457

(22) Filed: Sep. 12, 2019

(65) Prior Publication Data
US 2020/0086813 A1 Mar. 19, 2020

(30) Foreign Application Priority Data
Sep. 14, 2018 (DE) ...................... 10 2018 215 674.3

(51) Int. Cl.
*B60R 16/03* (2006.01)
*B60N 2/00* (2006.01)
*B60K 35/00* (2006.01)

(52) U.S. Cl.
CPC .............. *B60R 16/03* (2013.01); *B60K 35/00* (2013.01); *B60N 2/002* (2013.01);
(Continued)

(58) Field of Classification Search
CPC .. B60R 16/03; B60K 35/00; B60K 2370/167; B60K 2370/178; B60K 2370/52;
(Continued)

(56) References Cited

U.S. PATENT DOCUMENTS

| 8,527,146 B1* | 9/2013 | Jackson | B60W 50/0098 180/287 |
|---|---|---|---|
| 2004/0044293 A1* | 3/2004 | Burton | B60W 40/08 600/544 |
| 2004/0148062 A1 | 7/2004 | Franke | |

FOREIGN PATENT DOCUMENTS

| DE | 19942368 A1 | 3/2001 |
|---|---|---|
| DE | 10255435 A1 | 6/2004 |

(Continued)

OTHER PUBLICATIONS

Search Report dated Jun. 14, 2019 from corresponding German Patent Application No. DE 10 2018 215 674.3.

*Primary Examiner* — Muhammad Shafi (57) ABSTRACT

The invention relates to a method for reducing the start-up time of a driver information system in a vehicle comprising providing a driver information system having an operating mode, a standby mode, and a hibernation mode. The driver information system is operated with operating power in the operating mode, is not supplied with operating power in the hibernation mode, and is operated with reduced operating power in the standby mode. A seat occupancy detection device is provided for detecting seat occupancy of at least one vehicle seat. An activation system is provided for activating and operating the driver information system in the operating mode at least when the activation system is active; and changing the driver information system from the operating mode to the standby mode when the activation system is switched off and when seat occupancy is detected at the same time.

16 Claims, 4 Drawing Sheets

(52) U.S. Cl.
CPC .. *B60K 2370/167* (2019.05); *B60K 2370/178* (2019.05); *B60K 2370/52* (2019.05)

(58) Field of Classification Search
CPC ............. B60K 2370/741; B60N 2/002; B60W 2040/0881; Y02T 10/92
USPC .......................................................... 701/36
See application file for complete search history.

(56) References Cited

FOREIGN PATENT DOCUMENTS

| | | |
|---|---|---|
| DE | 102015220683 A1 | 4/2017 |
| DE | 102016015512 A1 | 6/2018 |
| KR | 200200123 Y1 * | 10/2000 |

* cited by examiner

1: Vehicle
2: Instrument Cluster
3: Ignition System
4: Drive Motor
5: Seat Sensor
6: Driver's Seat
7: Power Supply System
8: Front Camera

METHOD FOR REDUCING START-UP TIME, VEHICLE, COMPUTER PROGRAM AND DATA CARRIER SIGNAL

CROSS-REFERENCE TO RELATED APPLICATIONS

This application claims priority to German Application DE 10 2018 215 674.3, filed Sep. 14, 2018. The disclosures of the above applications are incorporated herein by reference in their entirety.

TECHNICAL FIELD

The invention relates to a method for reducing the start-up time of a driver information system in a vehicle. The invention furthermore relates to such a vehicle, a computer program and a data carrier signal.

BACKGROUND

A motor vehicle typically contains a driver information system that is usually designed as an instrument cluster for displaying functions such as speed, warnings, indicator lights, total mileage, etc. and that, in line with modern standards, also usually has an infotainment system having functions such as radio, navigation, a heating/air-conditioning controller, etc.

Due to certification-based requirements, a maximum between one to two seconds is mandatory for the time period from switching-on of an ignition and providing all of the parameters relevant to the driver and to the vehicle for the instrument cluster. Displaying the vehicle speed and achieving readiness to travel are, in particular, critical functions for which a short start-up time, also called launch or restart, is necessary. A start-up time of less than ten seconds is also expected for an infotainment system. The presentation of such functions and an operating system in vehicles however normally have a starting time of more than 10 seconds.

In addition, increasing use is being made of high-resolution graphical user surfaces, as well as modern technologies, such as 4K technology, animations and 3D depictions, which likewise lead to a longer loading time and therefore a longer start-up time. Achieving the required start-up time is therefore a major technical challenge and is able to be solved only by way of considerable technical optimization expenditure.

DE 102016015512 A1 relates to a device for accelerating the start of vehicle functions at the beginning of use of the vehicle following parking for electric power management of an on-board system of a motor vehicle, having a grid portion for supplying power to the on-board system of the motor vehicle, wherein the grid portion has a normal operation as a first operating state and a standby operation as a second operating state. A distributor device is provided, having electrical voltage levels on the output side for the supply of electric power to on-board system components of the on-board system of the motor vehicle. The distributor device is electrically connected to the grid portion, a state monitoring device, for monitoring the operating state of the grid portion and for driving the distributor device, and a computer device. The computer device is electrically connected on its input side to the output side of the distributor device via at least one electrical voltage level. The computer device has an operating system device and a volatile computer data memory. The volatile computer data memory is configured to keep stored onboard system state data of on-board system components of the on-board system of the motor vehicle. The distributor device is driven by the state monitoring device during normal operation such that voltage levels for the computer device and for on-board system components of the on-board system of the motor vehicle are provided. The distributor device is driven by the state monitoring device during standby operation such that just one voltage level for the volatile computer data memory of the computer device is provided, and wherein the volatile computer data memory is configured so as to be kept energized during standby operation as well, such that it does not lose its on-board system state data stored thereon.

DE 19942368 A1 discloses a motor vehicle having a plurality of controllers able to communicate with one another in order to drive electrical loads, wherein the controllers have a different functionality in various settable modes, and the controllers are able to be toggled by central commands between a logistics mode and a normal operating mode. Some of the controllers are completely blocked/switched off in the logistics mode, and other controllers are activated so as to perform their normal function, and wherein all of the controllers perform their normal functions that are known per se in the operating mode.

SUMMARY

The invention is based on the object of specifying a means that reduces the start-up time of a driver information system in a vehicle.

One embodiment to achieve this object is by specifying a method for reducing the start-up time of a driver information system in a vehicle, comprising providing a driver information system having an operating mode, a standby mode, and a hibernation mode. The driver information system is operated with operating power in the operating mode and the driver information system is not supplied with operating power in the hibernation mode and the driver information system is operated with reduced operating power in the standby mode. The method also comprises: providing a seat occupancy detection device, for detecting seat occupancy of at least one vehicle seat by a vehicle occupant; providing an activation system for activating the driver information system; operating the driver information system in the operating mode at least when the activation system is active; and changing the driver information system from the operating mode to the standby mode when the activation system is switched off and when seat occupancy is detected at the same time by the seat occupancy detection device.

The driver information system is actively operated in the operating mode. The driver information system is generally in an actively operated state in the moving vehicle. The operating mode may be achieved by switching on the activation system.

During standby operation, the driver information system is generally in a kind of "sleep mode", that is to say in a passive state. Displays etc. may for example be switched off, or non-essential functions of the driver information system may be deactivated. The driver information system thus consumes considerably less power in the standby mode than in the operating mode.

The driver information system is generally switched off in the hibernation mode. It should be borne in mind here that the driver information system does not comprise any systems, such as alarm systems, that have to be supplied with power even when the vehicle is at rest and not being operated.

The driver information system is put into operation by way of the activation system; by way of example, an activation system is the ignition system.

According to one aspect of the invention, when starting a warm engine, for example in the case of a taxi driver who has switched off the ignition but remains sitting on the driver's seat, the engine is started (up) in a very short time, for example in 0.5 seconds. The startup time of the driver information system likewise has to be kept very short here, since otherwise for example the speed is not displayed in the driver information system or on a graphical display of the driver information system, and an undesired excess speed is thus possible. This may lead to problems in particular for example in areas with a 30 km/h speed limit or walking speed. It has furthermore been recognized that, in the case of just an activation system that is switched on, for example the ignition, without moving operation of the vehicle, it is conceivable that the power supply system, for example, a vehicle battery, will be drained rapidly, such that it is no longer possible to start the vehicle.

In one embodiment, in the case of an occupied seat, typically the driver's seat, and with the activation system switched off at the same time, a change of the driver information system from the operating mode to the standby mode is brought about. The driver information system consumes less power in the standby mode than in the operating mode, that is to say that the required electric power is reduced as far as possible during engine standstill times. At the same time, however, the start-up time is improved, since the driver information system is not disconnected completely from the power supply and it is not necessary for example to reload data/configurations of the driver information system. By virtue of the reduced operating power that is necessary for the standby mode, the risk of draining for example the vehicle battery is able to be avoided, and at the same time the start-up time of the driver information system is able to be reduced.

Therefore, it is possible to dispense with cost-intensive alternatives, such as specific solutions for operating systems and graphical frameworks or expensive components, such as the use of an expensive NOR flash instead of a less expensive and often series-connected NAND flash. It is likewise possible to dispense with complex optimizations of the functions, for example to load only a first closed part when required immediately for the first displays when starting the driver information system and to load the rest later when required. It is furthermore possible to dispense with keeping the functions in the volatile memory of the driver information system, which would in turn require relatively expensive memory components that would also have to be supplied with power. Additionally, it is also possible to dispense with frequent restarts.

The activation system is provided as an ignition system. An ignition system may comprise an ignition that is able to be activated, that is to say ignited, with an ignition key. To this end, the ignition key is normally inserted into the ignition switch and turned to the right, into a first position, such that the ignition is activated. At the same time, the electrical loads, such as the infotainment system and the driver information system, are activated. If the ignition key is turned one position further, then the starter is actuated, which in turn starts the engine. A switched-on or activated ignition system should be understood to mean an ignition system in which the ignition key has been turned by at least one first position to the right or else in the case of a vehicle during operation. Ignition systems that operate differently, for example with a radio ignition key, are however likewise included here.

One embodiment of the method furthermore comprises the driver information system remaining in the standby mode when the activation system is switched off and seat occupancy is detected at the same time by the seat occupancy detection device and the driver information system changing to the hibernation mode when the activation system is switched off and lack of occupancy of the at least one vehicle seat, in particular of a driver's seat, is detected at the same time by the seat occupancy detection device. Since here, when leaving the vehicle, the hibernation mode is assumed when the ignition is switched off, unnecessary discharging for example of the vehicle battery is counteracted.

The seat occupancy detection device may also have a hibernation mode to which the seat occupancy detection device changes when the vehicle seat is not occupied. The power consumption is thereby minimized. A time interval may be provided, wherein a change of the driver information system and of the seat occupancy detection device to the hibernation mode is provided only after this time interval has elapsed, that is to say the change from the standby mode to the hibernation mode is performed only when the vehicle seat is unoccupied for this time interval. A situation whereby an unintended change is performed is thus able to be avoided.

An attention detection device having an operating mode during operation of the vehicle and a hibernation mode during lack of operation of the vehicle may be provided, which attention detection device is configured such that the attention detection device is operated in the operating mode when the driver information system is operated in the standby mode. The attention detection device may in this case may be a camera, such as a front camera. As a result, the attention detection device continues to deliver data, even when the driver information system is in the standby mode.

In a further configuration, an attention level of a driver is determined on the basis of at least one parameter that is detected by the attention detection device, wherein the driver information system changes from a standby mode to the hibernation mode when the attention level of the driver falls below a threshold value for a predefined period of time. In this case, the one parameter may be the viewing direction. A situation whereby the driver information system is in the standby mode for too long and the vehicle battery is thus for example discharged is thereby in particular able to be avoided. In this case, the driver denotes that vehicle occupant who is sitting on the driver's seat.

The driver information system may change from the hibernation mode to the standby mode when the threshold value of the attention level is exceeded. Upon detecting attention of the driver, the attention detection device triggers for example a signal or a notification, as a result of which the driver information system changes back from the hibernation mode to the standby mode. From this standby mode, the driver information system is then able to be provided with a shorter start-up time. The attention detection device wakes the driver information system up again, as it were, such that a shorter start-up time when switching on the activation system is possible.

As an alternative, when the driver information system changes from the standby mode to the hibernation mode, the attention detection device may also go into a hibernation mode, that is to say be switched off. Power is thereby able to be saved. As a result, however, it is no longer possible for the attention detection device to "wake up" the driver information system.

The seat occupancy detection device may be configured, following an initial activation, so as to switch off only when the activation system is switched off and when the seat occupancy detection device no longer detects occupancy of the at least one vehicle seat. In this case, the at least one vehicle seat is for example the driver's seat.

The object is furthermore achieved by specifying a vehicle for performing the method as described above, the vehicle having a driver information system, wherein the driver information system has an operating mode and a standby mode and a hibernation mode, wherein the driver information system is able to be operated with operating power in the operating mode and the driver information system is not supplied with operating power in the hibernation mode and the driver information system is able to be operated with reduced operating power in the standby mode.

A seat occupancy detection device is provided, for detecting seat occupancy of at least one vehicle seat by a vehicle occupant. An activation system is provided for activating the driver information system, wherein the driver information system is configured such that the driver information system is able to be operated in the operating mode when the activation system is active. The driver information system is configured such that there is provision to change the driver information system from the operating mode to the standby mode when the activation system is switched off and when seat occupancy is detected at the same time by the seat occupancy detection device.

The invention provides a vehicle having a driver information system that has a reduced start-up time. The advantages of the method may also be transferred to the vehicle. An active activation system may be designed as a switched-on ignition system.

A power supply system for supplying power to the driver information system is preferably provided, wherein the power supply system provides operating power for the driver information system in the operating mode and the power supply system provides no power for the driver information system in the hibernation mode and the power supply system provides reduced operating power for the driver information system in the standby mode. The power supply system preferably comprises a vehicle battery. This type of power supply is simple to implement.

The driver information system may remain in the standby mode when the activation system is switched off and seat occupancy is detected at the same time by the seat occupancy detection device and for the driver information system to change to the hibernation mode when the activation system is switched off and lack of occupancy of the at least one vehicle seat, for example of a driver's seat, is detected at the same time by the seat occupancy detection device. A further power reduction is thereby possible.

In one configuration, an attention detection device for detecting the attention level of the driver is provided, wherein the attention detection device has an operating mode and a hibernation mode, wherein the attention detection device is caused to remain in the operating mode when the activation system is switched off and seat occupancy is detected at the same time by the seat occupancy detection device. This may for example be a vehicle camera. A further power reduction is thereby possible.

The at least one vehicle seat may be a driver's seat that is occupied by the driver.

In a further configuration, the seat occupancy detection device comprises at least one sensor. This may be incorporated for example as a pressure sensor in the armrest or in the vehicle seat. Simple detection of seat occupancy is thus possible.

A computer program comprising commands that cause the vehicle as described above to execute the method as described above. Computer program in this case means an executable program for any vehicle processor having any existing vehicle operating system.

A data carrier signal transmits the abovementioned computer program. An electronic data carrier signal is formed by any digital signal sequence that is able to be stored in a volatile or non-volatile electronic memory. Such a computer program may be transmitted for example via cloud or a network, for example by the vehicle manufacturer within the context of retrofitting, without the vehicle owner having to find a garage.

The data carrier signal may be configured such that a vehicle as described above is able to be retroactively upgraded with a program as described above. The data carrier signal may in this case be transmitted wirelessly or by the vehicle manufacturer or another provider and incorporated into the vehicle operating system.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

Further features, properties and advantages of the present invention emerge from the following description with reference to the attached figures, in which, schematically.

Although the invention has been described and illustrated in more detail through the preferred exemplary embodiment, the invention is not limited by the disclosed examples. Variations thereof may be derived by those skilled in the art without departing from the scope of protection of the invention as is defined by the following patent claims.

DETAILED DESCRIPTION

Figure 1:
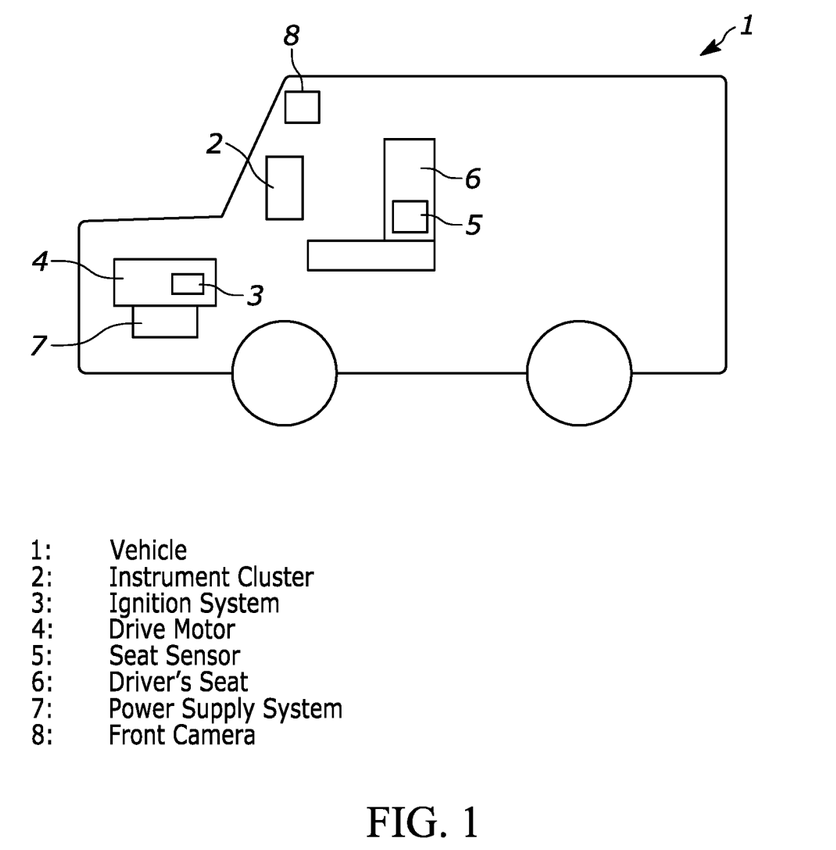
FIG. 1: shows a block view of a vehicle according to the invention having a device according to the invention.

FIG. 1 shows a vehicle 1 according to the invention in a block illustration. The vehicle has a driver information system that may be configured here as an instrument cluster 2 (also central instrument). This may be configured as an instrument block for displaying tachometer, mileage counter, revolution counter, fuel gauge, coolant temperature display, warning lights and direction indicators, indicator lights and speed, total mileage, seat occupancy detection device, etc. The instrument cluster 2 may furthermore also have an infotainment system having a radio, navigation system and heating and air-conditioning controller.

The vehicle 1 furthermore comprises an ignition system 3 as activation system having an ignition for activating the instrument cluster 2 and for igniting the ignition, for example using an ignition key. Using the ignition key, it is possible to activate the ignition, which closes an ignition circuit such that a drive motor 4 is able to be started. It is likewise possible to activate electrical loads, such as the instrument cluster 2, by turning the ignition key. The vehicle 1 additionally has a seat occupancy detection device for detecting seat occupancy of a vehicle seat 6 by a driver. The seat occupancy detection device may comprise a seat sensor 5 that is arranged in an armrest or a seat cushion of the driver's seat 6 and/or be configured as a pressure sensor. It is likewise possible for the seat sensor 5 to react to body heat. The seat occupancy detection device is configured such that, following an initial activation, the seat occupancy detection device is switched off again only when the ignition system 3 is switched off and the seat occupancy detection device no longer detects occupancy of the driver's seat 6. The seat occupancy detection device is therefore active even after the ignition system 3 has been switched off. As an alternative, the seat occupancy detection device may be permanently active.

The vehicle furthermore requires a start-up time. Start-up time in this case denotes that time that is required, starting from a defined hibernation state of the instrument cluster 2, for operation to be possible following switching-on thereof by the ignition system 3 by way of a vehicle operating system present in the vehicle 1.

The start-up time is in this case calculated by assuming that the vehicle operating system was previously inactive and the instrument cluster 2 was not supplied with power by the power system 7. At the end of the start-up time, required configurations, synchronizations and further start mechanisms that the vehicle operating system possibly requires are therefore completed, and the instrument cluster 2 is able to display all of the vehicle-relevant parameters or make them available in another way. If the instrument cluster 2 comprises the infotainment system, then this is likewise made available.

The instrument cluster 2 of the vehicle 1 has an operating mode, a standby mode and a hibernation mode, wherein the instrument cluster 2 is operated with operating power in the operating mode and the driver information system is not supplied with operating power in the hibernation mode and the instrument cluster 2 is operated with reduced operating power in the standby mode. In this case, standby mode may be understood for example to mean that only some of the electrical loads in the instrument cluster 2, which supply for example safety-relevant parameters, are supplied with power. This may mean that at least some electrical loads in the instrument cluster 2 are not completely switched off, such that a quick startup of the instrument cluster 2 is possible. The power consumption is however in this case so low that a power supply system 7, for example the vehicle battery, is not notably loaded. By virtue of the standby mode, the instrument cluster 2 is able to be woken up again very quickly, since no data/configurations have to be loaded by the vehicle operating system upon starting.

The vehicle 1 may have, as power supply system 7, a vehicle battery for supplying power to the instrument cluster 2, which system provides operating power for the instrument cluster 2 in the operating mode. In the hibernation mode, the power supply system 7 does not provide any power for the instrument cluster 2. In the standby mode, the power supply system 7 provides reduced operating power for the instrument cluster 2. In this case, the reduced operating power for operation in the standby mode may be drawn from the existing vehicle battery without this being notably loaded.

Figure 2:
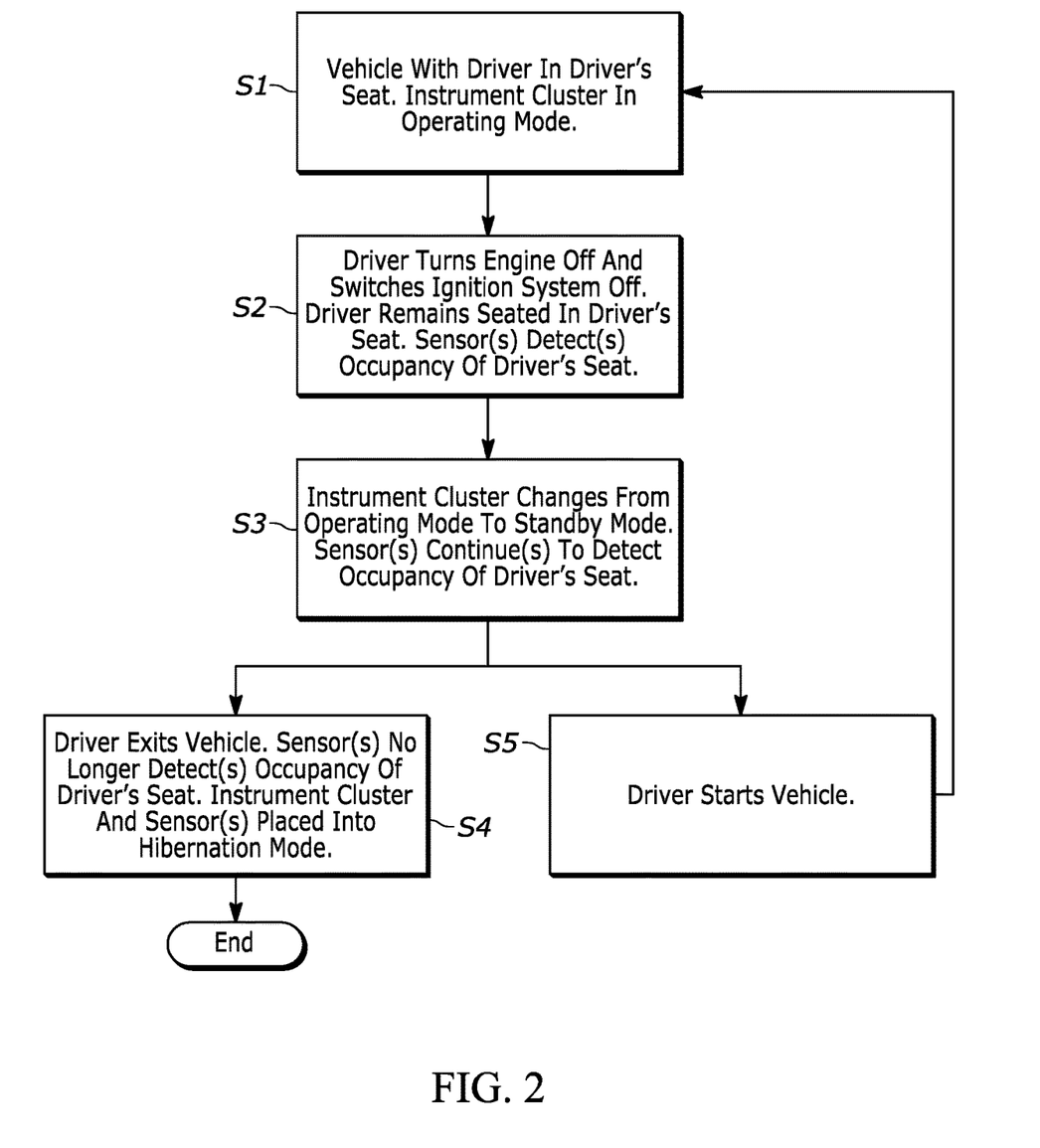
FIG. 2: shows a flowchart of a first exemplary embodiment of a method according to the invention.

FIG. 2 shows a flowchart of a first exemplary embodiment of the method according to the invention for reducing the start-up time of an instrument cluster 2 (FIG. 1) in a vehicle 1 (FIG. 1). In this case, a vehicle 1 (FIG. 1) with a driver on the driver's seat is operated in an operating mode in a step S1. This may be an operating mode in which the driver himself is driving, or an autonomous or partly autonomous/fully autonomous etc. operating mode. The power supply system 7 (FIG. 1) supplies the instrument cluster 2 (FIG. 1) with operating power.

In a step S2, the driver turns the engine off and switches the ignition system 3 (FIG. 1) off. To do this, he may pull out the ignition key or bring the ignition key into a zero position. The driver however at the same time remains seated on the driver's seat 6 (FIG. 1). The sensor or sensors 5 (FIG. 1) therefore detects/detect occupancy of the driver's seat 6 (FIG. 1).

In a step S3, this changes the instrument cluster 2 from the operating mode to the standby mode. The sensors 5 (FIG. 1) of the driver's seat 6 (FIG. 1) are furthermore supplied with power such that it is possible to detect occupancy of the driver's seat 6 (FIG. 1) even when the ignition is switched off. The instrument cluster 2 (FIG. 1) requires only reduced operating power in the standby mode, this being supplied by the power supply system 7 (FIG. 1), for example by a vehicle battery. The detection of seat occupancy may in this case be notified to a control system that has taken over control of the instrument cluster 2 (FIG. 1) and of the sensors 5 (FIG. 1) and of the power supply system 7 (FIG. 1).

In a step S4, the driver gets out of the vehicle 1. The sensors 5 (FIG. 1) of the driver's seat 6 (FIG. 1) now no longer notify occupancy of the driver's seat 6 (FIG. 1). The notification may in this case be given again to the control system, which then puts the instrument cluster 2 (FIG. 1) and the sensors 5 (FIG. 1) into the hibernation mode. In this hibernation mode, the sensors 5 (FIG. 1) and the instrument cluster 2 (FIG. 1) no longer require electric power. The method is therefore ended. The instrument cluster 2 (FIG. 1) and the sensors 5 may be put into the hibernation mode only when the sensors 5 notify lack of occupancy of the driver's seat over a predefined time interval. An unintentional change is thus able to be prevented.

In a step S5, the driver starts the vehicle 1 (FIG. 1) from the standby mode. By virtue of the standby mode, the start-up time of the instrument panel 2 (FIG. 1) is significantly shortened, since the configurations/data no longer have to be loaded from the vehicle operating system. This particularly applies when there are only a few minutes between switching off the ignition and restarting, and the vehicle 1 is quickly ready for starting. By virtue of the standby mode of the instrument cluster 2 (FIG. 1), the required instrument cluster 2 (FIG. 1) for example with a display of vehicle-relevant parameters is also ready for use again just as quickly.

This may be useful for taxis or taxi drivers or other passenger transport vehicles. The vehicle 1 may also be configured as an air taxi, water taxi, etc.

After the vehicle 1 is restarted, the method begins again with step S1.

Figure 3:
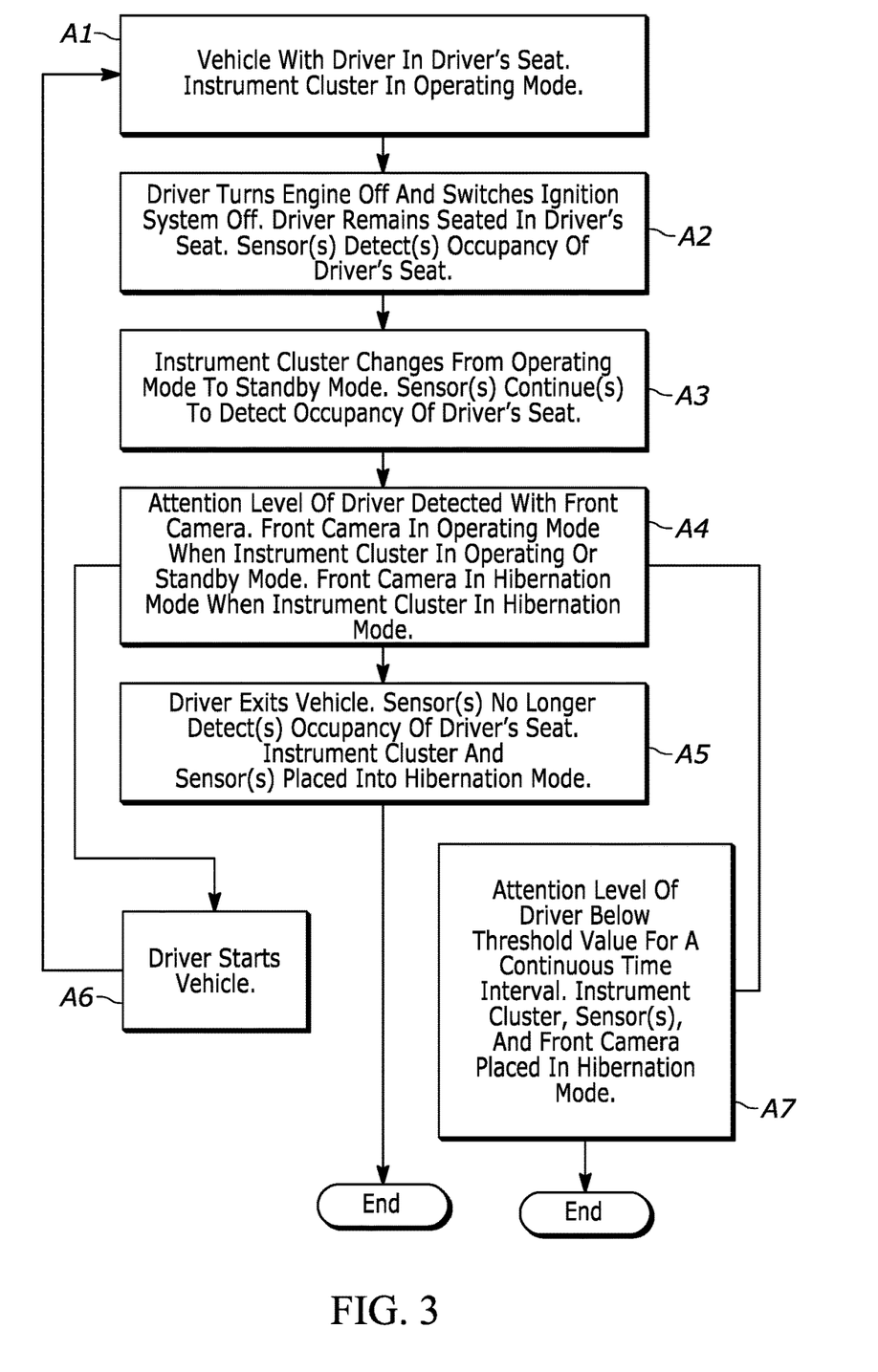
FIG. 3: shows a flowchart of a second exemplary embodiment of the method according to the invention.

FIG. 3 shows a flowchart of a second exemplary embodiment of the method according to the invention for reducing the start-up time of an instrument cluster 2 (FIG. 1) in a vehicle 1 (FIG. 1). In this case, a vehicle 1 (FIG. 1) with a driver on the driver's seat is operated in an operating mode in a step A1. This may be an operating mode in which the driver himself is driving, or an autonomous or partly autonomous/fully autonomous etc. operating mode. The power supply system 7 (FIG. 1) supplies the instrument cluster 2 (FIG. 1) with operating power.

In a step A2, the driver turns the engine off and switches the ignition system 3 (FIG. 1) off. To do this, he may pull out the ignition key or bring the ignition key into a zero position. The driver however at the same time remains seated on the driver's seat 6 (FIG. 1). The sensor or sensors 5 (FIG. 1) therefore detects/detect occupancy of the driver's seat 6 (FIG. 1). In a step A3, this changes the instrument cluster 2 (FIG. 1) from the operating mode to the standby mode. The sensors 5 (FIG. 1) of the driver's seat 6 (FIG. 1) are furthermore supplied with power such that it is possible to detect occupancy of the driver's seat 6 (FIG. 1) even when the ignition is switched off. The instrument cluster 2 (FIG. 1) requires only reduced operating power in the standby mode, this being supplied by the power supply system 7 (FIG. 1), for example the vehicle battery. The detection of seat occupancy may in this case be notified to a control system that has taken over control of the instrument cluster 2 (FIG. 1) and of the sensors 5 (FIG. 1) and of the power supply system 7 (FIG. 1).

In a step A4, the attention level of the driver is detected by way of an attention detection device configured as a front camera 8 (FIG. 1). This may detect the current viewing direction as driver parameter, for example using pupil movement. The attention level may then be calculated from the pupil movement. The front camera 8 (FIG. 1) has an operating mode during operation of the vehicle and a hibernation mode during lack of operation of the vehicle. If the instrument cluster 2 (FIG. 1) is in the standby mode, then the front camera 8 (FIG. 1) continues to be operated in the operating mode, as a result of which the attention level of the driver is detected.

In a step A5, the driver gets out of the vehicle 1. The sensors 5 (FIG. 1) of the driver's seat 6 (FIG. 1) now no longer notify occupancy of the driver's seat 6 (FIG. 1). The notification may in this case be given again to the control system, which then puts the instrument cluster 2 (FIG. 1) and the sensors 5 (FIG. 1) into the hibernation mode. In this hibernation mode, the sensors 5 (FIG. 1) and the instrument cluster 2 (FIG. 1) and the front camera 8 (FIG. 1) no longer require electric power. The method is therefore ended.

In a step A6, the driver starts the vehicle from the standby mode. By virtue of the standby mode, the start-up time of the instrument cluster 2 (FIG. 1) is significantly shortened, since for example the configurations/data no longer have to be loaded from the vehicle operating system. This may apply when there are only a few minutes between switching off the ignition and restarting, and the vehicle 1 is quickly ready for starting. By virtue of the standby mode of the instrument cluster 2 (FIG. 1), the required instrument cluster 2 (FIG. 1) for example with a display of vehicle-relevant parameters also is ready for use again just as quickly. The front camera 8 (FIG. 1) is in this case uninterrupted in the operating mode and records the attention level. This is at least partly above a predefined threshold value.

In a step A7, the attention level of the driver is below a predefined threshold value for a continuous time interval, for example five minutes, for example the driver is sleeping with the ignition switched off. This notification is for example given again to the control system, which puts the instrument cluster 2 (FIG. 1) and the sensors 5 (FIG. 1) and the front camera 8 (FIG. 1) into the hibernation mode. In this hibernation mode, the sensors 5 (FIG. 1) and the instrument cluster 2 (FIG. 1) and the front camera 8 (FIG. 1) no longer require electric power. The method is therefore ended.

Figure 4:
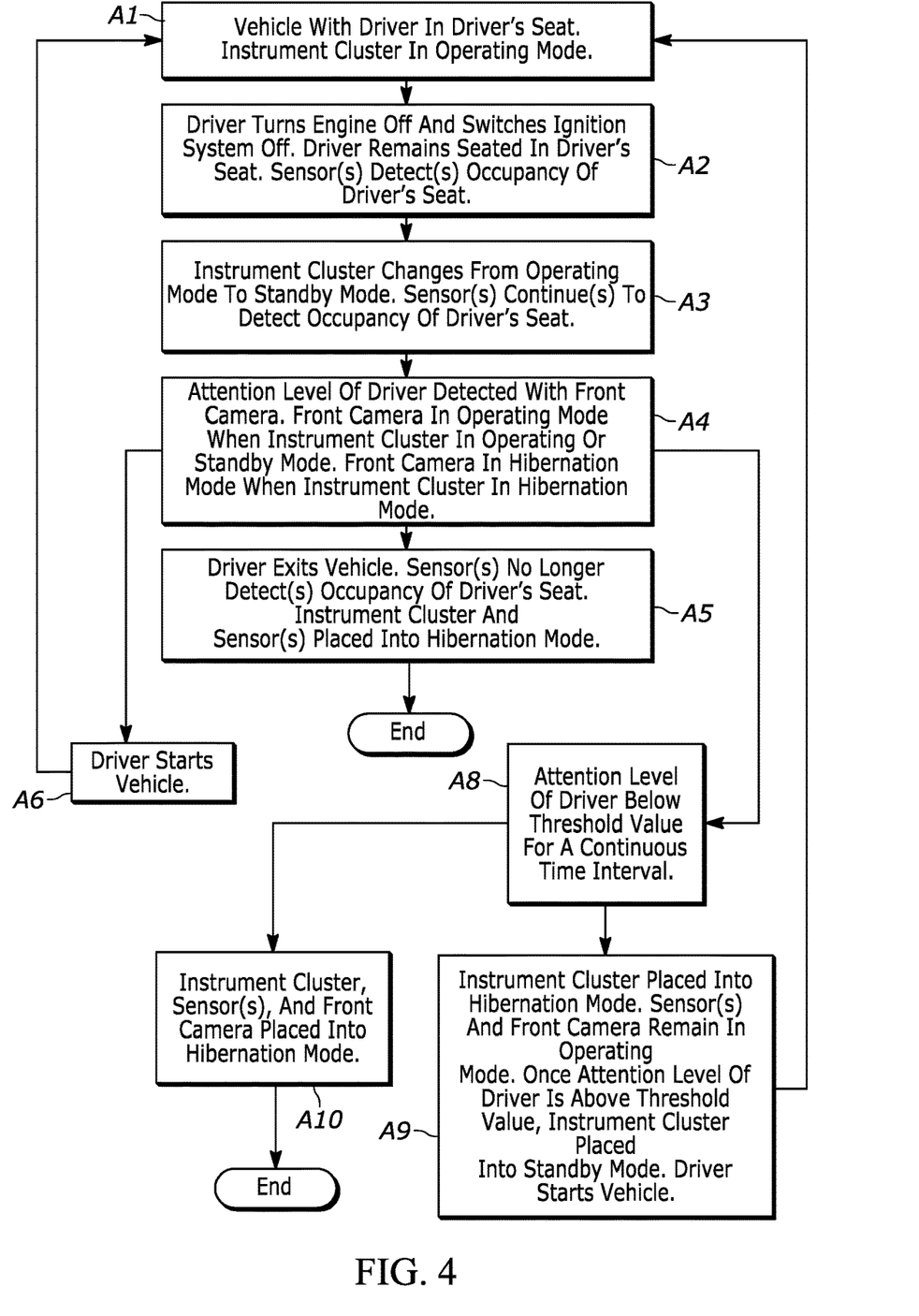
FIG. 4: shows a flowchart of a third exemplary embodiment of the method according to the invention.

FIG. 4 shows a flowchart of a third exemplary embodiment of the method according to the invention for reducing the start-up time of an instrument cluster 2 (FIG. 1) in a vehicle 1 (FIG. 1), which method is the same as that in FIG. 3 as far as step A7. Instead of step A7, however, a step A8 is performed. In a step A8, the attention level of the driver is below a predefined threshold value for a continuous time interval, for example five minutes, for example the driver is sleeping with the ignition switched off.

In a step A9, this notification about the attention level is again given for example to the control system, which puts the instrument cluster 2 (FIG. 1) into the hibernation mode. The sensors 5 (FIG. 1) for detecting seat occupancy of the driver's seat 6 and the front camera 8 (FIG. 1) however remain in the operating state. When the driver wakes up again, this is recorded by the front camera 8 (FIG. 1), which puts the instrument cluster 2 back into the standby mode. Quicker putting into service of the instrument cluster 2 after the driver wakes up is thereby able to be ensured, with at the same time low power consumption. When the driver starts the vehicle 1 (FIG. 1), the method is continued with step A1.

In a step A10, this notification about the attention level is for example given again to the control system, which puts the instrument cluster 2 (FIG. 1) and the sensors 5 (FIG. 1) and the front camera 8 (FIG. 1) into the hibernation mode. In this hibernation mode, the sensors 5 (FIG. 1) and the instrument cluster 2 (FIG. 1) and the front camera 8 (FIG. 1) no longer require electric power. The method is therefore ended.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A method for reducing the start-up time of a driver information system in a vehicle comprising:
   providing a driver information system having an operating mode, a standby mode, and a hibernation mode, wherein the driver information system in the operating mode is operated with operating power, wherein the driver information system in the standby mode is operated with reduced operating power, and wherein the driver information system in the hibernation mode is not supplied with operating power;
   providing a seat occupancy detection device, for detecting seat occupancy of at least one vehicle seat by a vehicle occupant;
   providing an activation system for activating the driver information system;
   providing an attention detection device for detecting the attention level of the driver, wherein the attention detection device has an operating mode and a hibernation mode;
   operating the driver information system in the operating mode at least when the activation system is active;
   changing the driver information system from the operating mode to the standby mode when the activation system is switched off and when seat occupancy is detected at the same time; and operating the attention detection device in the attention detection device operating mode when the activation system is switched off and when the seat occupancy is detected at the same time.

2. The method of claim 1, wherein the activation system is provided as an ignition system.

3. The method of claim 1, further comprising:
keeping the driver information system in the standby mode when the activation system is switched off and seat occupancy is detected at the same time; and
changing the driver information system to the hibernation mode when the activation system is switched off and lack of occupancy of the at least one vehicle seat is detected at the same time.

4. The method of claim 3, wherein the at least one vehicle seat is a driver's seat.

5. The method of claim 1, further comprising switching the seat occupancy detection device off only when the activation system is switched off and when the seat occupancy detection device no longer detects occupancy of the at least one vehicle seat, in particular of a driver's seat.

6. A vehicle comprising:
a driver information system, wherein the driver information system has an operating mode, a standby mode, and a hibernation mode, wherein the driver information system in the operating mode is operated with operating power, wherein the driver information system in the standby mode is operated with reduced operating power, and wherein the driver information system in the hibernation mode is not supplied with operating power;
a seat occupancy detection device which detects seat occupancy of at least one vehicle seat by a vehicle occupant;
an activation system for activating the driver information system; and
an attention detection device for detecting the attention level of the driver, wherein the attention detection device has an operating mode, and a hibernation mode,
wherein the driver information system is operated in the operating mode when the activation system is active and is changed from the operating mode to the standby mode when the activation system is switched off and when seat occupancy is detected at the same time, and
wherein the attention detection device remains in the operating mode when the activation system is switched off and seat occupancy is detected at the same time by the seat occupancy detection device.

7. The vehicle of claim 6, wherein the activation system is designed as an ignition system.

8. The vehicle of claim 6, further comprising a power supply system to supply power to the driver information system, wherein the power supply system provides operating power for the driver information system in the operating mode, provides no power for the driver information system in the hibernation mode; and provides reduced operating power for the driver information system in the standby mode.

9. The vehicle of claim 6, wherein the driver information system remains in the standby mode when the activation system is switched off and seat occupancy is detected at the same time and changes to the hibernation mode when the activation system is switched off and lack of occupancy of the at least one vehicle seat is detected at the same time by the seat occupancy detection device.

10. The vehicle of claim 9, wherein the at least one vehicle seat is a driver's seat.

11. The vehicle of claim 6, wherein the at least one vehicle seat is a driver's seat.

12. The vehicle of claim 6, wherein the seat occupancy detection device comprises at least one sensor.

13. A vehicle comprising:
an electronic control unit having a computer program with instructions for:
providing a driver information system having an operating mode, a standby mode, and a hibernation mode, wherein the driver information system in the operating mode is operated with operating power, wherein the driver information system in the standby mode is operated with reduced operating power, and wherein the driver information system in the hibernation mode is not supplied with operating power;
providing a seat occupancy detection device, for detecting seat occupancy of at least one vehicle seat by a vehicle occupant;
providing an activation system for activating the driver information system;
providing an attention detection device for detecting the attention level of the driver, wherein the attention detection device has an operating mode and a hibernation mode;
operating the driver information system in the operating mode at least when the activation system is active;
changing the driver information system from the operating mode to the standby mode when the activation system is switched off and when seat occupancy is detected at the same time; and
operating the attention detection device in the attention detection device operating mode when the activation system is switched off and when the seat occupancy is detected at the same time.

14. The vehicle of claim 13, further comprising a data carrier signal that transmits the computer program.

15. The vehicle of claim 14, wherein the data carrier signal that retroactively upgrades the computer program.

16. The vehicle of claim 13, wherein the electronic control unit having the computer program further comprises instructions for:
keeping the driver information system in the standby mode when the activation system is switched off and seat occupancy is detected at the same time; and
changing the driver information system to the hibernation mode when the activation system is switched off and lack of occupancy of the at least one vehicle seat is detected at the same time.

* * * * *